(12) United States Patent
Schoenhals

(10) Patent No.: US 7,930,253 B1
(45) Date of Patent: Apr. 19, 2011

(54) SYSTEM AND METHOD FOR CORRELATING USE OF SEPARATE NETWORK SERVICES

(75) Inventor: Mark D Schoenhals, Chicago, IL (US)

(73) Assignee: Mbira Technologies LLC, Chicago, IL (US)

( * ) Notice: Subject to any disclaimer, the term of this patent is extended or adjusted under 35 U.S.C. 154(b) by 868 days.

(21) Appl. No.: 10/648,103

(22) Filed: Aug. 26, 2003

(51) Int. Cl.
G06F 7/04 (2006.01)
G06F 17/30 (2006.01)
G06F 15/16 (2006.01)
H04L 29/06 (2006.01)
G06Q 20/00 (2006.01)

(52) U.S. Cl. ........... 705/80; 726/2; 726/5; 726/6; 726/7; 705/26; 705/27

(58) Field of Classification Search .......... 726/2–7; 705/50, 64, 80, 26, 27
See application file for complete search history.

(56) References Cited

U.S. PATENT DOCUMENTS

| 7,100,111 B2* | 8/2006 | McElfresh et al. ........... 715/517 |
| 2001/0037296 A1* | 11/2001 | Ganesan et al. ................. 705/40 |
| 2001/0038624 A1* | 11/2001 | Greenberg et al. ........... 370/352 |
| 2002/0169685 A1* | 11/2002 | Joao ................................. 705/26 |
| 2005/0038893 A1* | 2/2005 | Graham ......................... 709/228 |
| 2006/0200832 A1* | 9/2006 | Dutton ........................... 719/318 |
| 2007/0016523 A1* | 1/2007 | Blair et al. ..................... 705/40 |

* cited by examiner

Primary Examiner — Ponnoreay Pich
Assistant Examiner — Randal D Moran
(74) Attorney, Agent, or Firm — Tina M. Lessani; Lessani & Lessani LLP

(57) ABSTRACT

A system and method for correlating a user's use of a first network service with a user's use of a second network service. For each user with which the first network service communicates, the network service transmits a unique ID to the user such that the unique ID is visible to the user. When the user communicates with the second network service, the user provides the second network service with the unique ID. The first and second networks each may store some indication of their respective associations with the user. The user's use of the second network service is correlated with the user's use of the second network service based on the unique ID and any information stored by the networks in association with the unique ID.

24 Claims, 5 Drawing Sheets

FIG. 4

Office Etail Store

Viewing data for Webcode 1Z57Q      430      440

Interests               Products Viewed Recently               Orders Placed

| percentage interest | |
|---|---|
| 16.67% | Office Furniture |
| 12.50% | Office Supplies |
| 12.50% | Office Software |
| 12.50% | Staples |
| 8.33% | Fax Machines |
| 8.33% | Cardboard Boxes |

Item 001: Brand ABC Cardboard Box
Item 002: Brand DEF Stapler
Item 003: Brand GHI Flower Arrangement
Item 004: Brand DEF High-Capacity Stapler
Item 005: Love by Boss Mug None

410

Event Log

Go to   page  1  of 2         Next Page

| eventdate | time ago | event | eventlink |
|---|---|---|---|
| 2003-05-02 16:10:32 | 0 hours, 3 mins | category | Top |
| 2003-05-02 16:10:09 | 0 hours, 3 mins | porduct | Item 001: Brand ABC Cardboard Box |
| 2003-05-02 16:09:55 | 0 hours, 3 mins | product | Item 002: Brand DEF Stapler |
| 2003-05-02 16:09:47 | 0 hours, 4 mins | product | Item 003: Brand GHI Flower Arrangement |
| 2003-05-02 16:09:39 | 0 hours, 4 mins | product | Item 004: Brand DEF High-Capacity Stapler |
| 2003-05-02 16:09:34 | 0 hours, 4 mins | search | Search for "Cardboard Box" |
| 2003-05-02 16:08:46 | 0 hours, 5 mins | product | Item 005: Love by Boss Mug |
| 2003-05-02 16:08:42 | 0 hours, 5 mins | search | Search for "Stapler" |
| 2003-05-02 16:06:55 | 0 hours, 6 mins | category | Home Page |
| 2003-05-02 11:13:49 | 5 hours, 0 mins | category | Office Furniture |

420

| marketingid 505 | campaign 510 | keyword 520 | total sales 530 | total orders 540 | phone sales 550 | phone orders 560 |
|---|---|---|---|---|---|---|
| 1 | yahoo | office desk | $19.80 | 1 | $0.00 | 0 |
| 2 | yahoo | file cabinet | $19.90 | 1 | $0.00 | 0 |
| 3 | yahoo | stapler | $24.95 | 1 | $0.00 | 0 |
| 4 | yahoo | cardboard box | $35.40 | 1 | $35.40 | 1 |
| 5 | yahoo | fax machine | $39.99 | 1 | $0.00 | 0 |
| 6 | yahoo | calculator | $49.95 | 1 | $0.00 | 0 |
| 7 | yahoo | graph paper | $53.95 | 1 | $0.00 | 0 |
| 8 | yahoo | love my boss mug | $59.95 | 1 | $59.95 | 1 |
| 9 | yahoo | flowers | $61.85 | 1 | $0.00 | 0 |
| 10 | altavista | office desk | $63.55 | 1 | $0.00 | 0 |
| 11 | altavista | file cabinet | $69.95 | 1 | $0.00 | 0 |
| 12 | altavista | stapler | $119.95 | 1 | $119.95 | 1 |
| 13 | altavista | cardboard box | $119.95 | 1 | $0.00 | 0 |
| 14 | altavista | fax machine | $134.79 | 1 | $0.00 | 0 |
| 15 | altavista | calculator | $139.94 | 1 | $0.00 | 0 |
| 16 | altavista | graph paper | $149.94 | 1 | $149.94 | 1 |
| 17 | altavista | love my boss mug | $149.94 | 1 | $0.00 | 0 |
| 18 | altavista | flowers | $17.95 | 1 | $0.00 | 0 |
| 19 | kanoodle | office desk | $39.90 | 1 | $0.00 | 0 |
| 20 | kanoodle | file cabinet | $54.95 | 1 | $54.95 | 1 |
| 21 | kanoodle | stapler | $59.95 | 1 | $0.00 | 0 |
| 22 | kanoodle | cardboard box | $74.95 | 1 | $0.00 | 0 |
| 23 | kanoodle | fax machine | $79.98 | 1 | $0.00 | 0 |
| 24 | kanoodle | calculator | $88.80 | 1 | $88.80 | 1 |
| 25 | kanoodle | graph paper | $89.95 | 1 | $0.00 | 0 |
| 26 | kanoodle | love my boss mug | $99.99 | 1 | $0.00 | 0 |

Figure 5

SYSTEM AND METHOD FOR CORRELATING USE OF SEPARATE NETWORK SERVICES

BACKGROUND OF THE INVENTION

1. Field of the Invention

This invention relates to trackable network services and, more particularly, to a system and method for correlating a user's use of one network service with the user's use of another network service.

2. Description of the Background Art

It is desirable for a business to be able to correlate a user's use of one of its network services with a user's use of another of its network services, as businesses often communicate with potential customers through two or more channels. For instance, a customer may learn about a company's products on the company's website and then call the company to order or further enquire about a particular product.

One reason why correlating a user's use of different network services is desirable is to track the effect of advertising efforts. For example, if a company pays for a link to its website on a search engine site, such as Google or Yahoo, it is desirable for the company to know the percentage of its customers that used that link. Such information is relatively easy to track if the customer purchases a product on a company's website after using an advertised link. However, such information is usually lost if, after viewing the website, the customer elects to purchase the product through a different channel, such as the telephone network.

There are known methods for correlating the use of one network service with use of another network service when a user directly access one network from the other. For instance, one such method involves correlating the use of two websites, where users are required to register at the first website. After registering, the user is assigned a user ID. If a user selects a link to the second website directly from the first website, the registered user's user ID is transmitted directly through the applicable URL to the second website service, possibly embedded within the URL or through the use of shared third-party cookies. When the second website service receives the user ID, it is able to identify that the user initiated contact with it from the first network service. It can then associate the user's activity on the second website service with the same user ID. This method likely is used in a known referral website that provides a user with a rebate for (1) accessing a partner website through the referral website and (2) then purchasing a product on the partner website. The user IDs assigned by the referral website and passed on to the partner website enables one to determine (1) how much commission is due the referring website and (2) which customers of the partner website are entitled to a rebate.

Another such method involves sending a potential customer a personalized email newsletter with links to a website. The links are encoded with specific ID(s) assigned to the user so that such IDs are forwarded to the website service if the user selects the link. Such IDs are used to correlate use of the website with use/reading of the newsletter.

A disadvantage of the foregoing methods is that a user must initiate communication with the second network service through the first network service in order to correlate use of the first and second network services. If a user does not access the second network service through the first network service, any correlation between the two services with respect to that user is lost.

Another prior art method related to linking trackable, personalized network services involves correlating web records of a user with a telephone connection to a user when a user submits a request, through a company's website, to speak to a customer service representative. The telephone request is then associated with the user's web records, and a customer service representative calls the user. When the telephone connection is made between the customer service representative and the user, the customer service representative receives a copy of the web page currently being viewed by the user. This method has a disadvantage similar to that described above in that the user must request telephone service through the website in order to be able to correlate telephone and web interactions. Also, even after an initial correlation of records, any continued correlation of telephone and web records requires that future phone communication be requested from the company's website. If the user later phones the company on his own, the company cannot associate that phone call with previous (or future) web interactions.

One known method of linking a user's use of two trackable, personalized networks together that does not involves accessing one of the networks through the other network is to assign a "customer number" or "member number" to a customer when an order is placed or when a member registers. For instance, this method is sometimes used when a user orders a product over the phone and then later logs onto a website to check the status of the order. However, a customer or member number is something only customers (i.e., people who have purchased products) or members have, and, therefore, it is not provided to every user of a company's network services. Moreover, the records of a user's pre-purchase or pre-registration communications with the company are not tracked and correlated with the user's later purchase or registration.

Therefore, there is a desire for a method that (1) enables correlation of use of two or more network services even if users accesses each network service independently of the other and (2) does not require users to register or purchase products. Furthermore, it is desirable for such method to enable one to link a referral source (such as a promotional link) to one network service with use of another network service.

SUMMARY OF THE INVENTION

The present invention provides a system and method for correlating a user's use of a first network service with a user's use of a second network service when the user initiates communication with each network service independent of the other service. For each user with which the first network service communicates, the first network service transmits a unique ID to the user such that the unique ID is visible to the user. When the user communicates with the second network service, the user provides the second network service with the unique ID. The first and second networks each may store some indication of their respective communications with the user. The user's use of the second network service is correlated with the user's use of the first network service based on the unique ID and on any information stored by the networks in association with the unique ID. An example of such correlation is associating product sales through the second network with a referral source for first network.

BRIEF DESCRIPTION OF THE DRAWINGS

FIGS. 4 and 5 illustrate example screen shots generated in accordance with one embodiment of the present invention.

DETAILED DESCRIPTION OF THE PREFERRED EMBODIMENTS

Figure 1:
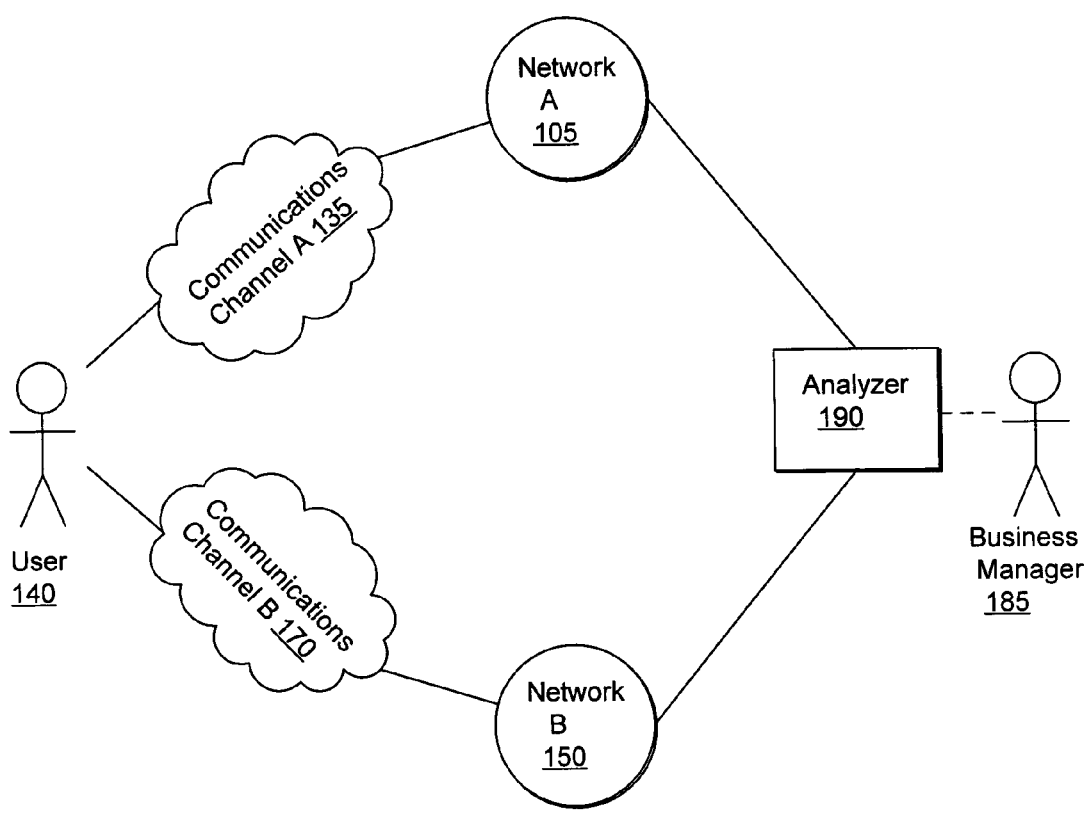
FIG. 1 illustrates a system according to one embodiment of the present invention.
Figure 2:
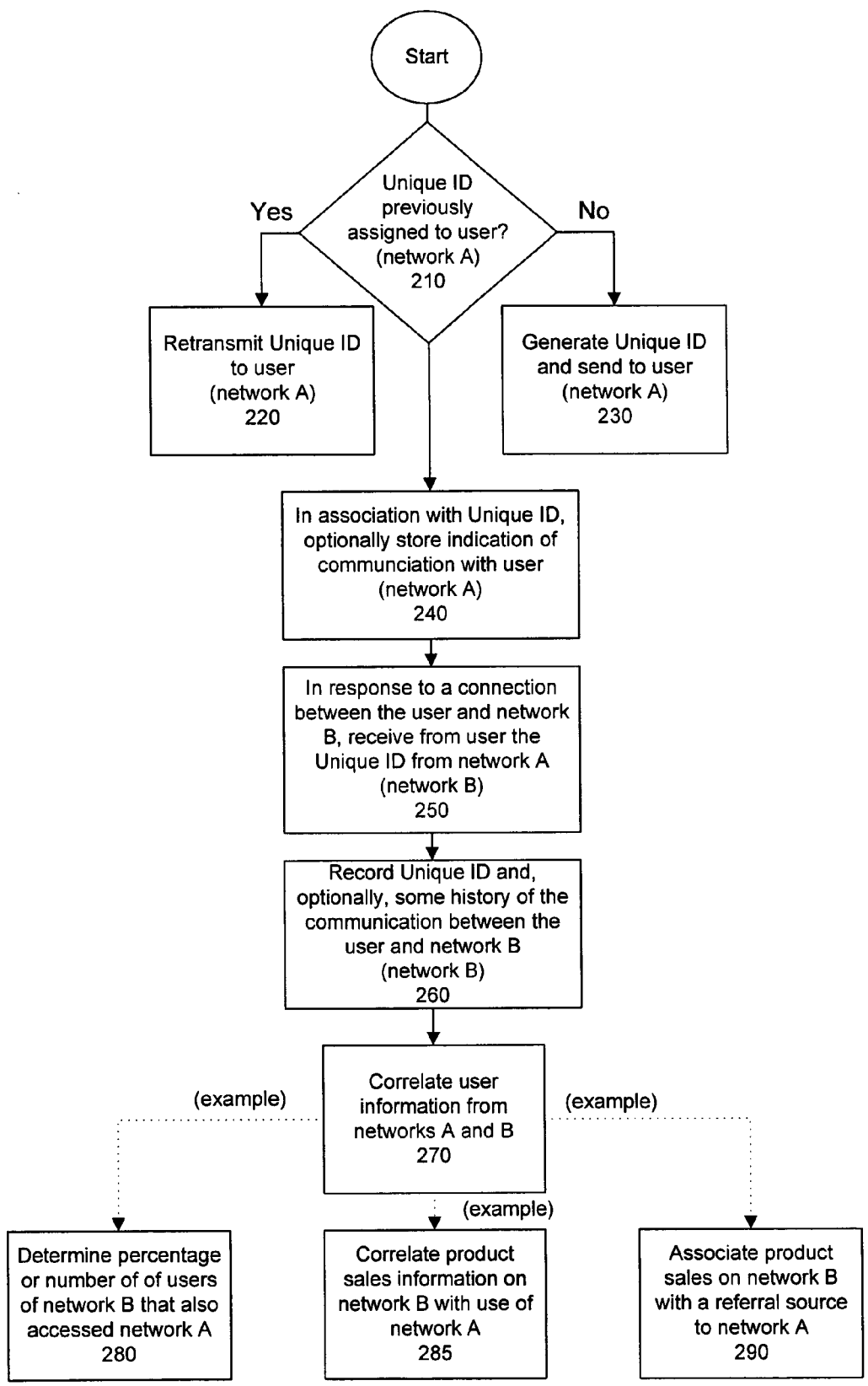
FIG. 2 illustrates a method for correlating a user use of a first network service with a user's use of a second network service according to one embodiment of the present invention.

FIG. 2 illustrates a method for correlating a user's use of one network service with a user's use of another network service. For reference, this method is described with respect to the system 100 illustrated in FIG. 1, but such method is not limited to system 100.

System 100 includes network A 105 and network B 150, which each provide a trackable service to a user 140 in the sense that at least some history of the communication between the user 140 and the network can be recorded. Furthermore, network A 105 provides a service that can transmit personalized information over communication channel 135 to the user 140, where examples of such service include a website, a cable service and a catalog service. Network B 150 provides a service that is capable of receiving personalized information from a user 140, where examples of such service include telephone customer service, email customer service, live chat customer service, and an interactive website.

Referring to FIG. 2, for each user 140 with which network A 105 communicates, the network A 105 determines 210 whether the user 140 has been assigned a unique ID for network A 105. For instance, if network A 105 is a network for a website, the network A 105 may ascertain whether a unique ID has been previously encoded into relevant "cookie" information in the user's 140 web browser. If the network A 105 provides a cable service or catalog service, the network A 105 can search a database of previously assigned unique IDs to determine whether a unique ID has been assigned to the relevant household at issue. If a unique ID has been previously assigned to a user 140 (where assigned to a user does not necessarily mean assigned to an individual human user, but can mean associated with a user's web browser, cable service, household, etc. as applicable), the network A 105 retransmits 220 the unique ID to the user over communication channel 135. Otherwise, network A 105 generates 230 a new unique ID and sends it to user 140 over communication channel 135. In an alternate embodiment, even if the user has previously been assigned a unique ID, network A generates a new unique ID for each communication session with the user and then records the correlation between all previously assigned unique IDs and the new unique ID.

The unique ID is visible to the user of network A 105. One example of the way in which the unique ID is presented to the user 140 is "Call toll free ### ###-#### and mention UNIQUE ID for the low promotional prices." While communication channel 135 is capable of transmitting a unique ID to user 140, other content moving in communication channel 135 need not be unique and bandwidth can be shared by multiple users.

Network A 105 keeps a record of each unique ID transmitted to a user 140, and, with every communication with a user, network A 105 may optionally record 240, in association with the unique ID, some history or indication of the communication. For instance, if network A 105 is a network for a website, some of the history recorded could include specific pages and searches requested by the user, the date and time in which these requests were made, special marketing or tracking codes (e.g., codes that define a particular advertisement or link origin) appended to requested pages, and/or any referral source from another website to the website of network A 105 (e.g., a sponsored or unsponsored link selected by the user on another website).

In response to a connection being made between user 140 and network B 150, the unique ID sent to user 140 from network A is received 250 at network B 150. In one embodiment, the user 140 conveys such information in reply to an inquiry for a unique ID from a human or automated customer service representative associated with network B 150. Because the unique ID generated by network A 105 is visible to the user and can be submitted by the user to network B 150, network B 150 can obtain the unique ID even if the user accesses network B 150 independently of network A 105.

Network B 105 records 260 the user's 140 unique ID and, optionally, some history or indication of the communication between user 140 and network B 150 (where such information is recorded in association with the unique ID). For instance, the information recorded by network B 150 may include products purchased by the user and/or inquires made by the user.

The unique IDs can be used to correlate 270 user information from networks A 105 and B 150 and, hence, to ascertain information about network use and operation. For instance, one can determine 280 the number or percentage of users of network B 150 that also accessed network A 105 by calculating the number of network B 150 users that provided network B 150 with a unique ID from network A 105. Such calculations can be further extended to associate 285 product sales information on network B 150 with use of network A 105.

Furthermore, with the help of analyzer system 190, a business manager 185 or other agent can correlate, based on unique IDs, records of network B 150 with records of network A 105. For instance, if network A 105 is a website, it can store, in association with a user's unique ID, an indication of any referral links (e.g., a sponsored link on a third party website) on which the user clicked to get to the network A 105 website. If that user then purchases a product through network B 150, network B 150 records information related to the product sale in association with user's unique ID. The analyzer system 190 can then correlate the user's network B 150 records with user's network A 105 records to associate 290 the product sales information on network B 150 with the referral source for network A 105. In some cases, the business manager 185 can use such information to initiate commission payments to websites affiliated with referral sources. Also, correlating the records from the two networks can enable one to track margin dollars per sponsored link or ad, emails received per sponsored link or ad, and various other data, depending on the type of information recorded by each network in association with the unique IDs.

In addition, analyzer system 190 can be used to help a customer service representative in network B 150 better serve a user. Specifically, the analyzer system 190 can retrieve any record from network A 105 that is associated with a unique ID provided by the user to such customer service representative, summarize or process the information in such record, and then provide the customer service representative with a summary and/or analysis of the relevant user's activity on network A 105.

Figure 3:
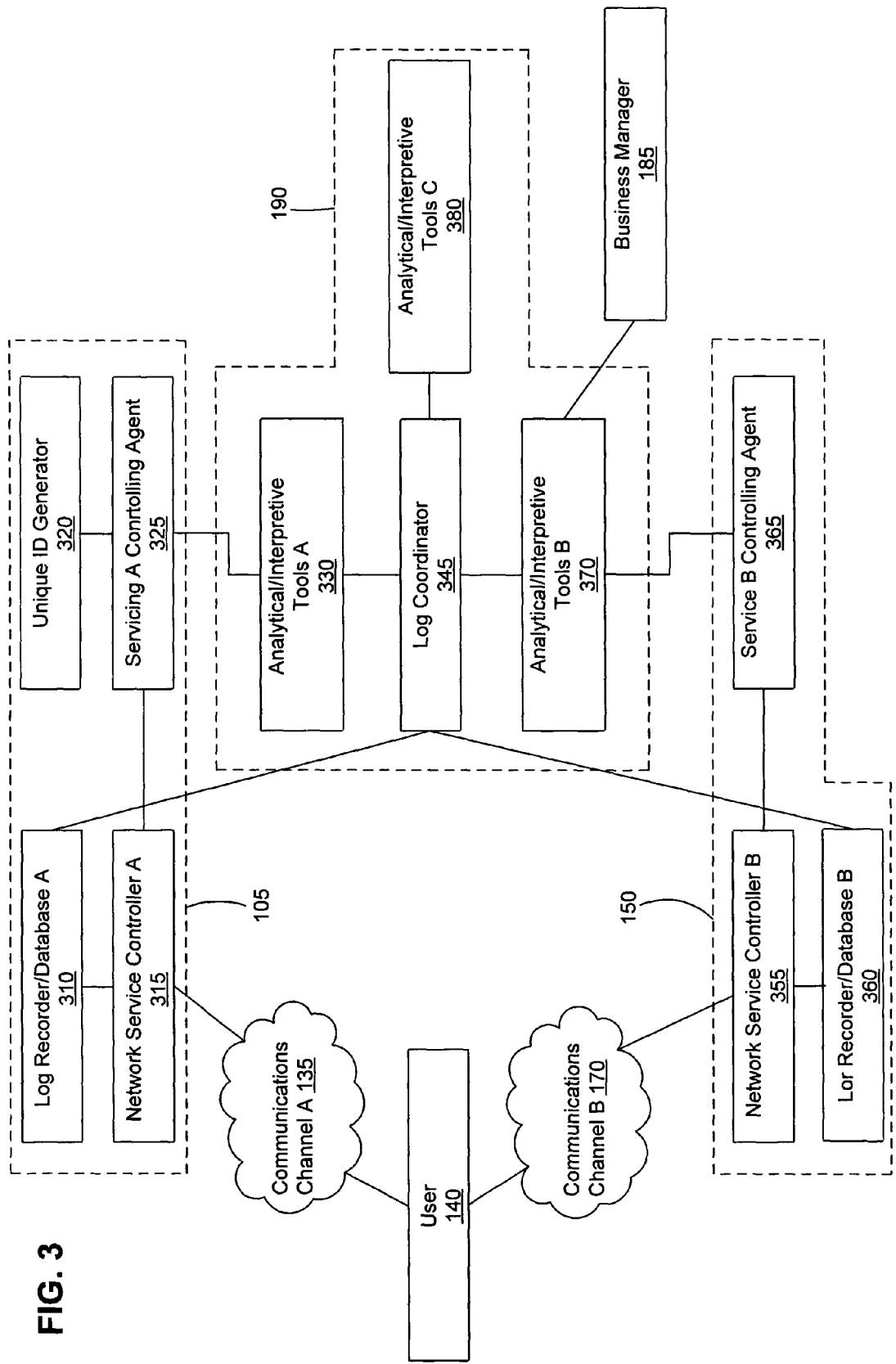
FIG. 3 illustrates one embodiment of the system of FIG. 1.

FIG. 3 illustrate one embodiment of system 100. Network A 105 includes a log recorder/database 310, network service controller 315, unique ID generator 320, and service controlling agent 325. These components represent functionality of the network, and those skilled in the art will appreciate that such functionality can be combined into one component or can be implemented as any number of components.

Network service controller 315 receives information from and transmits information to the user 140, and network service controlling agent 325 processes the information received from user 140 and controls the information content transmitted by network service controller 315. Unique ID generator generates a unique ID for each new user 140, and log recorder/database 310 records the unique IDs and, optionally, a history of the communications with the user.

In one embodiment, network 105 is a network for a website (e.g., an ecommerce site). In one such case, service controlling agent 325 is a set of scripts and databases (e.g., PHP/MySQL) that creates the website pages; network service controller 315 is a standard web server, such as an Apache web server; communication channel 335 is a standard TCP/IP connection using http transfers; the unique ID generator 320 is a set of scripts and databases that generate numeric IDs in sequential order; and log recorder/database 310 is a MySQL database controlled by PHP scripts.

In the embodiment of FIG. 3, network B 150 includes a log recorder/database 360, network service controller 355, unique ID generator 320, and service controlling agent 325. As the case with network A 105, these components represent functionality of the network, and those skilled in the art will appreciate that such functionality can be combined into one component or can be implemented as any number of components. For instance, log recorder/database 310 and log recorder/database 360 can be implemented as a single log recorder/database.

Network service controller 355 receives information from and transmits information to the user 140, and network service controlling agent 325 processes the information received from user 140 and controls the information content transmitted by network service controller 355. Log recorder/database 360 records any unique ID received from the user 140 and, optionally, a history of the communications with the user.

In one embodiment, network service controller 355 is a computer-based phone switch, and communication channel 370 is a standard voice communication channel, which connects to network service controller 355 via a T1 PRI line and which connects to a user on standard Plain Old Telephone System (POTS) line. In such embodiment, the service controlling agent 365 can be a human customer service representative, who requests the unique ID from the user, and records it, as well as any product order or other relevant information indicative of the interaction with the user (such as a question asked by a user), in a web browser interface (or other interface) to log recorder/database 360. In the event the user 140 does not have or does not know his/her unique ID, a special reserve unique ID may be used by the service controlling agent 165 to indicate this. Optionally, the service controlling agent 365 is prevented from completing a recording of the product order if the agent does not enter either the user's unique ID or an indication that a unique ID was not available. Service controlling agent 365 may also be an automated attendant.

In one embodiment, log recorder/database 360 is a set of PHP/MySQL scripts and databases that records the unique ID and any corresponding product order entered by the service controlling agent 365. The log recorder/database 360 may also further record the status of an order, including whether it was shipped and/or later returned.

In the embodiment of FIG. 3, analyzer system 190 includes a log coordinator 345 that associates records in log recorder/database 310 with records in log recorder/database 360. The log coordinator 345 may be a set of scripts and databases (PHP/MySQL) that compare related tables in log recorder/databases 310 and 360.

The analyzer system 190 also includes analytical/interpretative tools A 330, B 370, and C 380, which produce reports related to the data in log coordinator 345. Analytical/interpretative tools A 330 and B 370 enable agents associated with network A 105 and network B 150, respectively, to view information related to the data in log coordinator 345. Analytical tools C 380 enable a business manager 185 to view information in log coordinator 345 in order to assess the operation of networks A 105 and B 150 (such as described above with respect to step 270 in FIG. 2). In one embodiment, the analytical/interpretative tools A 330, B 370, C 380 each comprise a SQL database and a set of SQL queries that produce reports based on the data in log coordinator 345. The analytical/interpretative tools A 330, B 370, and C 380 may also include scripts that iteratively process the output from SQL queries and summarize them statistically.

FIGS. 4 and 5 illustrate examples of the type of information that can be generated by analytical/interpretative tool B 370 and C 380, respectively, based on user interaction with networks A 105 and B 150. In these examples, network A 105 provides a website for selling office supply products; network B is a telephone service through which users can order or inquire about the products; and service B Controlling Agent 365 is a customer service representative.

FIG. 4 is an example of a page generated by analytical/interpretative tools B 370 and viewed by a customer service representative 365 upon entering the unique ID of a user 140. In this scenario, network A 105 has stored, in association with the user's unique ID, the pages and searches requested by user 140 on the network A 105 website. Log coordinator 345 retrieves this information from network A 105, and the analytical/interpretative tools 370 use this information to generate a table 410 of the user's 140 interest by category, where a percentage is associated with each category. The customer service representative 365 can use this information to better advise or make product suggestions to the user 140.

Those skilled in the art will appreciate that there are various ways to profile user interest. One way is to treat each product page view as an indication of reasonable interest in the related product category or categories. For instance, if a user views a page related to an office chair, the user could be profiled with "1 point" of interest in the category "office furniture." If the user then views a page related to an office chair, the user would have "2 points" associated with the category "office furniture." The percentage of total points in any given category is an indication of the user's interest in the category.

Analytical tools 370 also generate a table 420 of all the user activity (i.e., pages and searches requested) on the network A 105 website, including the time elapsed since such activity occurred. The page also includes a list 430 of specific products viewed by the user and a list 440 of products previously ordered by the user 140 (which in this example is none).

FIG. 5 is an example of the type of information generated by analytical/interpretive tools C 380 and viewed by a business manager 185 to assess the value of certain advertising efforts. In this example, tracking codes are associated with third-party sites (e.g., Yahoo) that display a sponsored link to the website of network A 105 in response to a user entering select keywords (e.g., words that related to office products), where the tracking codes are embedded within the inbound link using any number of methods known to one skilled in the art. When a user selects one of such links, network A 105 stores the relevant tracking code, as well as the keyword(s) entered by the user, in association with the unique ID. If the user visits the website of network A 105 from more than one tracked origin site, credit is given to one of the tracked origin sites (e.g., the first or last site) in accordance with applicable rules established for such scenario. Giving credit to the first or last site are the standard rules, but there can be many varieties. If the third-party website does not embed special tracking codes within the inbound link to the website of network A 105, the identity of the referring third-party website may be obtained from referral information provided by some web browsers.

In order to obtain the information illustrated in FIG. 5, the analytical interpretative tools 380 initiate searches of log recorder/databases 310 and 360 to identify the unique IDs associated with product sales on network A 105 or network B 150. The analytical/interpretative tools C 380 then further narrow such list of unique IDs by identifying those that are also associated with select tracking codes, where the tracking codes represent third-party websites, such as Yahoo or AltaVista. As keyword information is also stored in association with the unique IDs and tracking codes, such unique IDs are categorized by unique tracking code/keyword combinations, which enables the analytical/interpretive tools C 380 to determine the number of orders and total sales associated with each combination. In the example of FIG. 5, the combination of column 510 and 520 lists each unique website/keyword combination; column 530 lists the total sales associated with each unique combination; and column 540 illustrates the total orders associated with each combination. Such information enables a business manager to determine the effectiveness of sponsored links on third-party websites.

FIGS. 4 and 5 illustrate merely examples of the type of information that can be generated by the analytical/interpretative tools, and different parameters can be used to search and display data.

The present invention is not limited to a two network system. The method described with respect to FIG. 2 is applicable to a system with multiple networks. Each additional network could either send unique IDs to or receive unique IDs from users as described herein. For instance, network B 150 could receive unique IDs from users of network A 105 as well as users of an additional third network. Moreover, FIG. 3 is merely an example of system 100, and system 100 may be implemented in other ways.

As will be understood by those familiar with the art, the invention may be embodied in other specific forms without departing from the spirit or essential characteristics thereof. Accordingly, the disclosure of the present invention is intended to be illustrative and not limiting of the invention.

The invention claimed is:

1. A method for correlating a user's use of a website with a user's phone call to a customer service agent for a business, where the phone call to the customer service agent is made independent of the website, the method comprising:
   for each user that accesses the website, transmitting a webpage to the user that visibly displays a unique ID, where the unique ID is unique to the user's web browser, and where the unique ID is generated without obtaining information that identifies the user personally;
   storing a record of the unique IDs that have been displayed to users in a webpage;
   in response to a user telephoning a customer service agent for the business independent of the website, obtaining the user's unique ID from the user; and correlating the user's call to the customer service agent with the users' use of the website using the user's unique ID.

2. The method according to claim 1, further comprising:
   storing information related to a user's use of the website in association with the unique ID displayed to the user.

3. The method according to claim 2, further comprising storing, in association with the user's unique ID, information related to the customer service agent's interaction with the user.

4. The method according to claim 1, further comprising determining, using the unique IDs, the number of users that called a customer service agent that also accessed the website.

5. The method according to claim 1, wherein the user can purchase products through the customer service agent and wherein the method further comprises using the user's unique ID to correlate any product sales purchases made by the user through the customer service agent with information about the user's use of the website.

6. The method of claim 1, wherein the method further comprises:
   in response to the user clicking on an online advertisement to reach the website, storing information about the advertisement in association with the unique ID displayed to the user.

7. The method of claim 6, further comprising:
   using the unique ID displayed to the user and the stored information about the advertisement to correlate the advertisement with any product sales to the user through the customer service agent.

8. The method of claim 1, wherein the webpage supports an Internet chat service.

9. The method of claim 1, wherein transmitting a webpage with a unique ID to the user comprises:
   for each user that accesses the website, determining whether the user's web browser has a cookie from the website with a unique ID;
   if the web browser has a cookie from the website with a unique ID, retrieving the unique ID from the cookie and transmitting a webpage with the retrieved unique ID to the user; and
   if the web browser does not have a cookie from the website with a unique ID, generating a unique ID, adding the generated unique ID to the record of unique IDs, and transmitting the unique ID to the user in a webpage.

10. The method of claim 1, wherein transmitting a webpage with a unique ID to the user comprises:
   for each user, generating a unique ID for the user;
   determining whether the user's web browser has a cookie with another unique ID from the website;
   in response to the user's web browser having a cookie with another unique ID from the website; recording an association between the newly generated unique ID and the unique ID in the cookie; and
   transmitting the newly generated unique ID to the user in a webpage.

11. The method of claim 1, wherein the customer service agent is a live person.

12. The method of claim 1, wherein the customer service agent is an automated attendant.

13. A method for correlating a user's use of a website with a user's phone call to a customer service agent for a business, where the user's phone call is made independent of the website, the method comprising:
   for each user that accesses the website, transmitting a webpage to the user that visibly displays a unique ID, where the unique ID is unique to the user's web browser and where the unique ID is generated without obtaining information that identifies the user personally;
   for each user that phones a customer service agent for the business independent of the website, asking the user if he has a unique DD from the website;

in response to a user indicating he has a unique ID from the website, obtaining the unique ID from the user; and correlating such user's call to the customer service agent with user use of the website by correlating records from each of the website and customer service agent call center using the unique IDs.

14. The method of claim 13, wherein the user may purchase products through the customer service agent and wherein the method further comprises using the user's unique ID to correlate any product purchases made by the user through the customer service agent with information about the user's use of the website.

15. The method of claim 13, wherein the method further comprises:

in response to the user clicking on an online advertisement to reach the website, storing information about the advertisement in association with the unique ID displayed to the user.

16. The method of claim 15, further comprising:

using the unique ID displayed to the user and the stored information about the advertisement to correlate the advertisement with any product sales to the user through the customer service agent.

17. The method of claim 13, wherein the customer service agent is a live person.

18. The method of claim 13, wherein the customer service agent is an automated person.

19. A system for correlating user use of a website with a user's phone call to a customer service agent for a business, where the phone call is made independent of the website, the system comprising:

a web server for the website that transmits a web page that visibly displays a unique ID to each user that accesses the website, where, for each user, the unique ID is unique to the user's web browser, and unique ID is generated without obtaining information that identifies the user personally;

a first database for storing a record of the unique IDs that have been displayed to users of the website;

a second database that stores the unique ID of each user that submits a unique ID to a customer service agent; and an analyzer that correlates users' calls to a customer service agent, made independent of the website, with users' use of the website by correlating records in the first and second databases associated with matching unique IDs.

20. The system of claim 19, wherein the analyzer correlates products purchased through a customer service agent with user information associated with the website.

21. The system of claim 19, if a user clicked on an online advertisement to reach the website, the first database records information about the advertisement in association with the unique ID.

22. The system of claim 21, where the analyzer correlates an advertisement that linked to the website with products sold through a customer service agent.

23. The system of claim 21, wherein the second database records, in association with the unique ID, information related to the interaction between a customer service agent and the user.

24. The system of claim 19, wherein the webpage supports an Internet chat service.

* * * * *